United States Patent [19]

van der Meer et al.

[11] Patent Number: 5,470,913
[45] Date of Patent: Nov. 28, 1995

[54] POLYMER MIXTURE WHICH COMPRISES A POLYAMIDE, A POLYPHENYLENE ETHER AND AN AGENT TO IMPROVE THE IMPACT RESISTANCE

[75] Inventors: Roelof van der Meer, Bergen op Zoom, Netherlands; Charles F. Pratt, Niskayuna, N.Y.; Johannes W. J. de Munck, Huybergen, Netherlands; Jean M. H. Heuschen, Schoten, Belgium

[73] Assignee: General Electric Company, Pittsfield, Mass.

[21] Appl. No.: 428,402

[22] Filed: Oct. 26, 1989

Related U.S. Application Data

[62] Division of Ser. No. 275,685, Nov. 23, 1988, abandoned, which is a continuation of Ser. No. 7,161, Jan. 27, 1987, abandoned.

[30] Foreign Application Priority Data

Jan. 27, 1986 [NL] Netherlands ............................ 8600166

[51] Int. Cl.⁶ .................................................... C08L 77/00
[52] U.S. Cl. ............................. 525/66; 525/63; 525/133; 525/397
[58] Field of Search ............................. 525/66, 397, 133, 525/63

[56] References Cited

U.S. PATENT DOCUMENTS

| 4,554,320 | 11/1985 | Reimann et al. ........................ 525/183 |
|---|---|---|
| 4,584,331 | 4/1986 | Tamura et al. ........................... 524/119 |
| 4,600,741 | 7/1986 | Aycock et al. ............................. 525/92 |

FOREIGN PATENT DOCUMENTS

| 0024120 | 2/1981 | European Pat. Off. . |
|---|---|---|
| 0046040 | 2/1982 | European Pat. Off. . |
| 0147874 | 7/1985 | European Pat. Off. . |
| WO8505372 | 12/1985 | WIPO . |

*Primary Examiner*—Ana L. Carrillo

[57] ABSTRACT

The invention relates to polymer mixtures which comprise a polyphenylene ether, a polyamide and an agent to improve the impact resistance. The agent is an olefinic based polymer such as an ethylene-propylene copolymer or an ethylene-propylene-non-conjugated diene terpolymer, on which a vinylmonomer having a carboxylic acid group or a derivative thereof or on which a vinylmonomer having an epoxy group has been grafted or an alkylene-alkyl(meth)acrylate copolymer having an alkylene group with 2–6 carbon atoms and having an alkyl group with 1–8 carbon atoms or an alkylene-alkyl(meth)acrylate having a functional group, which functional group has been introduced either by a polymerisation reaction while forming a terpolymer or by a grafting reaction, the functional group being selected from carboxylic acid groups, acid anhydride groups, acid amide groups, imido groups, carboxylic acid ester groups, amino groups, hydroxyl groups or epoxy groups and in which the alkylene group of the alkylenealkyl(meth)acrylate comprises 2–6 carbon atoms and the alkyl group thereof comprises 1–8 carbon atoms.

2 Claims, No Drawings

POLYMER MIXTURE WHICH COMPRISES A POLYAMIDE, A POLYPHENYLENE ETHER AND AN AGENT TO IMPROVE THE IMPACT RESISTANCE

This application is a divisional application of Ser. No. 275,685, filed Nov. 23, 1998, now abandoned, which in turn is a continuation of application Ser. No. 007,161, filed Jan. 27, 1987, now abandoned.

The invention relates to a polymer mixture which comprises a polyamide, a polyphenylene ether, one or more agents to improve the compatibility of the polyamide and the polyphenylene ether, and an agent to improve the impact resistance.

BACKGROUND OF THE INVENTION

Polymer mixtures which comprise a polyamide, a polyphenylene ether, an agent to improve the compatibility of the polyamide and the polyphenylene ether and optionally an agent to improve the impact resistance are known from EP-A 0024120; EP-A 0046040; EP-A 0147874; WO 85/05372 and WO 86/02086.

It is stated in EP-A 0024120 that it is desirable to incorporate in the polymer mixtures rubber-like polymers having a high molecular weight to improve the impact resistance. By way of example are mentioned inter alia ethylene-propylene, ethylene-propylene-diene copolymers and partially hydrogenated styrene/butadiene block copolymers. There are no examples in which these rubber-like polymers are used. According to EP-A 0024120, a liquid diene compound or an epoxy compound or a compound having a double or triple carbon to carbon bond in the molecular structure and a carboxylic acid, acid anhydride, acid amide, imido, carboxylic acid ester, amino or hydroxyl group is used as an agent to improve the compatibility—in the meaning as will be defined hereinafter.

According to EP-A 0046040 the polymer mixtures described therein may comprise an agent improving the impact resistance. In the Specification are mentioned by way of example a) graft polymers obtained by graft polymerization of a monomer which comprises as the main constituent a vinylaromatic compound on a rubber-like polymer and b) thermoplastic elastomers. One graft polymer which is mentioned by name is high-impact polystyrene. As thermoplastic elastomers are mentioned inter alia hydrogenated and non-hydrogenated styrene-butadiene block copolymers and styrene-ethylene-propylene polymers. It is stated that the graft polymer or the thermoplastic elastomer can be used individually or in combination. High-impact polystyrene having a high polybutadiene content and combinations of high-impact polystyrene and a hydrogenated styrene-butadiene block copolymer are used in the examples. One of these agents, notably the hydrogenated styrene-butadiene block copolymer, is generally considered as an agent which is particularly suitable to improve the impact strength of polyphenylene ether or of mixtures of polyphenylene ethers and high-impact polystyrene. The polymer mixtures according to EP-A 0046040 comprise a copolymer with units of a vinylaromatic compound and an alpha-beta dicarboxylic acid anhydride or an imide of an alpha-beta unsaturated dicarboxylic acid as an agent to improve the compatibility.

The polymer mixtures according to EP-A 0147874 may comprise one or more agents to improve the impact strength: mentioned by name as such are high-impact polystyrene, polybutadiene, ethylene-propylene-diene rubbers and hydrogenated or non-hydrogenated thermoplastic rubbers. This Patent Application does not give any examples in which agents improving the impact strength are used. According to this Application, a copolymer with 50–90 mol% units of a vinylaromatic compound and with 41–50 mol% units of an unsaturated dicarboxylic acid or a derivative thereof is used as an agent to improve the compatibility.

WO 85/05372 describes modified polyphenylene ether-polyamide compositions comprising polyphenylene ether, polyamide and a polycarboxylic acid as agent to improve the compatibility. Said compositions may further comprise an agent to improve the impact. Numerous agents are suggested. The examples deal with styrene-hydrogenated or non-hydrogenated butadiene triblock copolymers.

WO 86/02086 describes thermoplastic compositions comprising a polyphenylene ether, a polyamide and a functionalized polyphenylene ether as agent to improve the compatibility. Said compositions may further comprise rubbery high-molecular weight polymers to further improve the physical properties. A long list of such rubbery polymers are mentioned. The examples deal with styrene-ethylene-butylene-styrene copolymers only.

SUMMARY OF THE INVENTION

The polymer mixture according to the invention comprises an olefinic based agent to improve the impact. The use of such impact modifier results in a polymer mixture with a good balance of properties, in particular with respect to impact resistance.

In the polymer mixtures according to the invention the agent to improve the impact resistance may consist of a mixture of agents to improve the impact resistance.

DETAILED DESCRIPTION OF THE INVENTION

As the agent to improve the impact strength may be used in the polymer mixtures according to the invention an ethylene-propylene copolymer or an ethylene-propylene-non-conjugated diene terpolymer on which a vinylmonomer with a carboxylic acid group or a derivative thereof has been grafted or on which a vinyl monomer with an epoxy group has been grafted.

The polymer mixtures according to the invention may comprise as the agent to improve the impact strength an alkylene-alkyl(meth)acrylate copolymer with an alkylene group having 2–6 carbon atoms and with an alkyl group having 1–8 carbon atoms.

The polymer mixtures according to the invention may comprise as the agent to improve the impact strength an alkylene-alkyl(meth)acrylate with functional groups, which functional groups have been introduced either by a polymerization reaction while forming a terpolymer or by a grafting reaction, the functional group being selected from carboxylic acid, acid anhydride groups, acid amide groups, imido groups, carboxylic acid ester groups, amino groups, hydroxyl groups or epoxy groups, the alkylene group of the alkylene-alkyl(meth)acrylate comprising 2–6 carbon atoms and the alkyl group thereof comprising 1–8 carbon atoms.

The polymer mixture according to the invention comprises the said constituents preferably in the following quantities, the percentages being calculated by weight with respect to the sum of the quantities by weight of polyamide(s), plus polyphenylene ether(s), plus impact resistance improving agent(s): 5–94% of polyamide(s), 94–5% of polyphenylene ethers; 1–50% of agent(s) to improve the impact resistance.

The polymer mixtures according to the invention comprise one or more agents to improve the compatibility of the polyamide and the polyphenylene ether. These are to be understood to be agents which facilitate the mixing in the melt of two non-miscible polymers and also improve the bonding between the phases in such systems (see Chapter I of "Polymer-Polymer Miscibility", Academic Press, 1979). In practice this means that said agents suppress the tendency to phase agglomeration and delamination of two-phase polymer mixtures.

The polymer mixtures according to the invention comprises as the agent to improve the compatibility by preference one or more compounds selected from the following groups:

A) liquid diene polymers or epoxy compounds or compounds having in their molecular structure a double or triple carbon-to-carbon bond and a carboxylic acid, acid anhydride, acid amide, imido, carboxylic acid ester, amino or hydroxyl group in a quantity of from 0.01 to 30 parts by weight per 100 parts by weight of polyamide plus polyphenylene ether, B) a functionalised polyphenylene ether consisting of the reaction product of (a) a polyphenylene ether and (b) a compound of the general formula (i)—Z—(ii), wherein (i) is at least a group of the formula [X—C(O)] with X=F, Cl, Br, I, OH, —Or, or —O—C(O)—R with R=H, alkyl or aryl, wherein (ii) is at least a carboxylic acid, acid anhydride, acid amide, imido, carboxylic acid ester, amino or hydroxyl group, and in which the groups (i) and (ii) are covalently bonded together via a bridge Z, Z being a bivalent hydrocarbon radical.

C) a silane compound having in its molecular structure both (a) at least one silicon atom which is bonded to a carbon atom via an oxygen bridge and (b) at least an ethylenic carbon-to-carbon double bond or a carbon-to-carbon triple bond and/or a functional group selected from an amine group and a mercapto group, the functional group not being bonded directly to the silicon atom, in a quantity of from 0.05 to 4 parts by weight of polyamide plus polyphenylene ether, D) an oxidized polyolefin wax, optionally in combination with an organic phosphite, in a quantity of from 0.01 to 10 parts by weight per 100 parts by weight of polyamide plus polyphenylene ether, E) a copolymer with units of a vinylaromatic compound and of an alpha-beta unsaturated dicarboxylic acid or dicarboxylic acid anhydride or a copolymer with units of a vinylaromatic compound and of an imide compound of an alpha-beta unsaturated dicarboxylic acid, in a quantity of from 0.5 to 100 parts by weight per 100 parts by weight of polyamide plus polyphenylene ether, F) the reaction product of a) a 1,2-substituted olefinic compound with carboxyl group or acid anhydride group, b) a polyphenylene ether and c) a radical initiator, in a quantity of from 0.5 to 150 parts by weight per 100 parts by weight of polyamide plus polyphenylene ether.

The agent for improving the compatibility mentioned sub B) or sub F) can replace the polyphenylene ether in the polymer mixtures according to the invention entirely or partly.

The agents mentioned above sub A) to B) for improving the compatibility are known from the Patent Applications mentioned hereinbefore.

The use of olefinic based impact modifiers in combination with one or more of the compatibilisation agents as mentioned here above under A) or B) offers distinct advantages i.e. optimal mechanical properties and a good surface appearance.

Upon preparing the polymer mixtures according to the invention it has been found that the way of preparing and notably the sequence in which the various constituents are mixed together often is of great importance to obtain optimum properties. The correct sequence depends on the specifically used constituents.

It is generally preferred to use a method in which the polyphenylene ether is mixed first with the agent to improve the compatibility before the polyphenylene ether is mixed with the remaining constituents. However, this does not hold in all cases.

Good results are also obtained by premixing the polyamide with the agent to improve the impact strength.

Mixing the individual constituents is preferably carried out by mixing in the melt, for example, in an extruder.

The polymer mixtures according to the invention comprise at least one or more compounds selected from each of the groups of compounds mentioned hereinafter:
polyphenylene ether
polyamide
agent to improve the compatibility
agent to improve the impact resistance
Polyphenylene ethers Polyphenylene ethers are compounds which are known per se. For this purpose reference may be made to the U.S. Pat. Nos. 3,306,874; 3,306,875; 3,257,357 and 3,257,358. Polyphenylene ethers are usually prepared by an oxidative coupling reaction—in the presence of a copper amine complex—of one or more two-fold or three-fold substituted phenols; homopolymers and copolymers, respectively, being obtained. Copper amine complexes derived from primary, secondary and/or tertiary amines may be used. Examples of suitable polyphenylene ethers are:
poly(2,3-dimethyl-6-ethylphenylene-1,4-ether)
poly(2,3,6-trimethylphenylene-1,4-ether)
poly [2-(4'-methyl phenyl)phenylene-1,4-ether]
poly(2-bromo-6-phenylphenylene-1,4-ether)
poly(2-methyl-6-phenylphenylene-1,4-ether)
poly (2-phenylphenylene-1,4-ether)
poly(2-chlorophenylene-1,4-ether)
poly(2-methylphenylene-1,4-ether)
poly(2-chloro-6-ethylphenylene-1,4-ether)
poly(2 -chloro-6-bromophenylene-1,4-ether)
poly(2,6-di-n-propylphenylene-1,4-ether)
poly(2-methyl-6-isopropylphenylene-1,4-ether)
poly(2-chloro-6-methylphenylene-1,4-ether)
poly(2-methyl-6-ethylphenylene-1,4-ether)
poly(2,6-dibromophenylene-1,4-ether)
poly(2,6-dichlorophenylene-1,4-ether)
poly(2,6-diethylphenylene-1,4-ether)
poly(2,6-dimethylphenylene-1,4-ether)

Copolymers, for example, copolymers derived from two or more phenols as used in the preparation of the above-mentioned homopolymers are also suitable. Furthermore suitable are graft copolymers and block copolymers of vinylaromatic compounds, for example, polystyrene, and of polyphenylene ether as described hereinbefore.

When an agent to improve the compatibility as indicated hereinbefore sub B) or F) is used, the polyphenylene ether may be replaced entirely or partly by said agent.

Polyamides

Polyamides are used in the polymer mixtures according to the invention. In the method according to the invention polyamides are used as the constituent B. All thermoplastic polyamides known per se may be used in the polymer mixtures according to the invention. Suitable polyamides are, for example, polyamide-4; polyamide-6; polyamide-4, 6; polyamide-6,6; polyamide-3,4; polyamide-12; polyamide-11; polyamide-6,10; polyamides prepared from terephthalic acid and 4,4'-diaminocyclohexyl methane, polyamides prepared from azelaic acid, adipic acid and 2,2-bis-(p-aminocyclohexyl)propane, polyamides prepared from adipic acid and metaxylylene diamine, polyamides from terephthalic acid and trimethyl hexamethylene diamine. Particularly suitable are the so called amorphous polyamides, which are well known in the art.

Agent to improve the compatibility.

The polymer mixtures according to the invention must comprise one or more constituents to improve the compatibility. The use of an agent to improve the the compatibility. The use of an agent to improve the compatibility in polymer mixtures which comprise a polyphenylene ether and a polyamide is known per se in itself. The polymer mixtures according to the invention comprise by preference one or more of the abovementioned agents to improve the compatibility.

The agents mentioned above sub (A) to improve the compatibility are known from EP-A-0 024 120. All the agents mentioned therein are suitable for the polymer mixtures according to the invention. Notably, maleic anhydride, maleic acid, fumaric acid, maleimides, maleic acid amides and further reaction products of the compounds just mentioned with a (di)amine, are particularly suitable. All the compounds mentioned in EP-A-0 024 120 on page 6, line 1 to page 12, line 27 are considered to be incorporated herein by reference.

The agents mentioned above sub B) for improving the compatibility are disclosed in WO 86/02086. The compounds mentioned therein can be obtained by reacting a polyphenylene ether with, for example, chloroethyanoyl succinic anhydride; trimellitic anhydride acid chloride; chloroformyl succinic anhydride; 1-acetoxyacetyl-3,4-dibenzoic acid anhydride, the acid chloride of terephthalic acid. The compounds formed can be purified by precipitation in methanol or acetone. These agents may be used in combination with primary or secondary amines, for example, butyl amine, dibutyl amine, n.octadecyl amine.

The agents mentioned above sub (C) to improve the compatibility are disclosed in EP-A-0182163. The silane derivatives mentioned therein have at least one silicon atom which is bonded to a carbon atom via an oxygen bridge. For that purpose, at least an alkoxy group or an acetoxy group will usually be present in the silane. Moreover, silicon atoms which are bonded together via an oxygen bridge, i.e. siloxane groups, may be present in the silane derivative. In addition, the silane derivatives must have at least one of the following characteristic features, namely the presence in the molecule of one or more carbon-to-carbon double bonds or triple bonds, an amino group and/or a mercapto group. The carbon-to-carbon double or triple bond may be coupled directly to the silicon atom. The mercapto group or the amino group may not be coupled directly to a silicon atom. Examples of suitable silane derivatives are: gamma aminopropyl triethoxy silane; vinyl-tris-(2-methoxy-ethoxy)silane; 5-(bicycloheptenyl)triethoxy silane and gamma mercaptopropyl trimethoxy silane.

The use of the compound mentioned above sub (D) to improve the compatibility is described in EP-A-0164767. Oxidized polyolefin waxes are compounds known per se. For this purpose reference may be made, for example, to DE-A 20 35 706; DE-A 30 47 915 and DE-A 22 01 862. These types of wax are usually prepared by oxidation in air or in suspension of a polyolefin wax.

The compounds mentioned above sub (E) are disclosed in EP-A 0 046 040 and EP-A 0 147 874. Examples of these compounds are styrene-maleic anhydride copolymers, styrene-maleic anhydride-methacrylate terpolymers, styrene-maleic anhydride-acrylate terpolymers, and the rubber-modified variants of these compounds.

The compounds mentioned above sub (F) and their mode of preparation are disclosed in Japanese Patent Applications 59/059,724; 59/086,653 and 59/066,452. They relate to the reaction product of a) a 1,2-substituted olefinic compound with carboxyl group or acid anhydride group (for example, maleic anhydride), b) a polyphenylene ether and c) a radical initiator (for example, benzoyl peroxide).

Agent to improve the impact strength.

The polymer mixtures according to the invention comprise an olefinic based agent to improve the impact resistance. Particularly suitable are the agents chosen from the following groups of compounds.

Ethylene-propylene copolymers or ethylene-propylene non-conjugated diene terpolymers on which a functional group has been grafted. Examples of functional groups are carboxylic acid groups or derivatives thereof. This type of agent to improve the impact is resistance disclosed in U.S. Pat. Nos. 3,884,882; 4,174, 358; 4,251,644; 4,346,194 and 4,448,934. It is also possible to use epoxy groups as functional groups, for example, by grafting glycidyl methacrylate on the copolymer or terpolymer.

Alkylene-alkyl(meth)acrylate copolymers with an alkylene group having 2–6 carbon atoms and with an alkyl group having 1–8 carbon atoms. These compounds are disclosed, for example, in U.S. Pat. Nos. 3,700,751 and 3,845,163. This type of polymer is prepared by copolymerizing an olefin, for example, ethylene, propylene, with one or more of the following monomers: a $C_1$–$C_8$ alkyl acrylate, for example, methyl acrylate, ethyl acrylate, hexyl acrylate and the like; a $C_1$–$C_8$ alkyl methacrylate, for example, methyl methacrylate, ethyl methacrylate, hexyl methacrylate and the like; acrylic acid or methacrylic acid. To be preferred are the known copolymers of ethylene with an alkyl ester of acrylic acid. In general, the acrylate content or methacrylate content of the copolymer may be from approximately 10 to approximately 30% by weight. The olefin content of the copolymer may be from approximately 70 to approximately 90% by weight. An example of the last-mentioned copolymers is an ethylene-ethyl acrylate copolymer with a weight ratio of ethylene to ethyl acrylate of approximately 4.5 to 1.

Alkylene-alkyl(meth)acrylate polymers with a functional group, which functional group has been introduced, for example, by a polymerisation reaction while forming a terpolymer or by a grafting reaction. The functional group has been selected from carboxylic acid groups, acid anhydride groups, acid amid groups, imido groups, carboxylic acid ester groups, amino groups, hydroxyl groups or epoxy groups. The alkylene group of the alkylene alkyl(meth)acrylate comprises 2–6 carbon atoms and the alkyl group thereof comprises 1–8 carbon atoms. This type of agents to improve the impact resistance is described, for example, in U.S. Pat. Nos. 4,436,872; 4,478,978. Particularly suitable are ethylene-ethyl acrylate-maleic acid polymers and ethylene-ethylacrylate-fumaric acid polymers. This type of polymers can also be obtained by complete or partial saponification of the above-mentioned non-functionalized alkylene alkyl(meth)-acrylate copolymers. For this purpose reference may be made to U.S. Pat. No. 4,485,214.

Of course it is possible to use a combination of one or more of the above-mentioned agents to improve the impact resistance.

The polymer mixtures according to the invention comprise the indicated constituents preferably in the following quantities, the said percentages being calculated by weight with respect to the sum of the quantities by weight of polyamide(s), polyphenylene ether(s) and impact-resistance-improving agent(s): 5–94% of polyamide(s); 94–5% of polyphenylene ethers; 1–50% of agent(s) to improve the impact resistance. The nonfunctionalized alkylene alkyl-(meth)acrylate polymers are preferably used in a quantity of less than 12.5%.

In addition to the above-mentioned constituents, the polymer mixtures according to the invention may comprise one or more of the following constituents: styrene homo- or copolymers, high-impact polystyrene, dyes, pigments, fillers, reinforcing fillers such as glass fibres, stabilizers and flame retarding agents. As stabilizers may be used the agents known generally for polyamides.

The polymer mixtures according to the invention may be prepared in various manners: by mixing solutions or slurries of the constituents, succeeded by evaporating or also by melt extrusion. Melt extrusion is generally preferred. In melt extrusion, the individual constituents are introduced, for example, into an extruder. In the extruder the constituents are heated, usually to a temperature above the melting temperature of the constituent(s) having the highest or one of the highest melting-point(s), for example, the polyphenylene ether, and intimately mixed. The extruder then produces the so-called extrudate, usually in the form of a strand, which is chopped up. The resulting pieces of the polymer mixtures according to the invention may further be processed according to techniques known per se for injection moulding of thermoplastic synthetic resins.

In preparing the polymer mixtures according to the invention in an extruder it has been found that the sequence in which the various constituents are mixed can be of importance. For example, polymer mixtures having better properties are often obtained when the polyphenylene ether or a part of the quantity of polyphenylene ether to be used is pre-mixed in an extruder in a separate step with the agent to improve the compatibility. The resulting pre-extrudate is then mixed with the remaining constituents in an extruder.

It is also possible first to prepare a pre-mixture of the polyamide or a part of the quantity of polyamide to be used and the agent to improve the impact resistance. The resulting pre-mixture is then mixed with the remaining constituents.

In some cases, polymer mixtures having better properties were obtained when first the polyamide or a part of the quantity of polyamide to be used, is mixed in the melt with the agent to improve the impact resistance; the polyphenylene ether or a part of the quantity of polyphenylene ether to be used is then mixed with the agent to improve the compatibility in the melt, after which the two resulting pre-mixtures and the constituents possibly not yet incorporated in the pre-mixtures are mixed in the melt.

The invention also relates to products obtained from the polymer mixtures according to the invention.

DESCRIPTION OF THE PREFERRED EMBODIMENTS

The invention will now be described with reference to the ensuing specific examples.

EXAMPLES I, II, III, COMPARATIVE EXAMPLE A

Four polymer mixtures were compounded by blending the components as indicated in table 1 herebelow in an extruder. The mixtures were compounded under vacuum at temperature settings of 220°–285° C. (different temperature zones). The extruder was operated at screw speed 300 rpm.

The used components were the following:

functionalized polyphenylene ether: the product obtained by reacting a polyphenylene ether with trimellitic anhydride acid chloride prepared according to WO 86/02086. The intrinsic viscosity of the functionalized polyphenylene ether was 57.5 ml/g (25° C., measured in chloroform).

polyamide: a polyamide-6,6 having a number-averaged molecular weight Mn of 20,000 and a viscosity index of 135 ml/g, measured according to ISO R 307 (0.5 g of polyamide dissolved in 100 g of 90% formic acid at 25° C.) and a moisture content of less than 0.2% by weight.

Functionalized EPM: an ethylene-propylene copolymer with a mol/ratio of 60:40, to which 0.6 mol/% maleic anhydride has been grafted.

Functionalized ethylene-acrylic rubber: a terpolymer of ethylene (66%)-butylacrylate and maleic anhydride.

Ethylene-ethyl acrylate copolymer: a copolymer of ethylene with 18% ethylacrylate.

Test bars according to ASTM D 638 were manufactured from the resulting polymer mixtures by injection moulding for the determination of the tensile yield strength and the elongation upon fracture. Test bars according to ASTM D 256 were also moulded for the measurement of the impact resistance according to notched Izod impact. Moreover the instrumented falling dart impact was measured on molded disks having a thickness of 3.2 mm and a diameter of 100 mm. In this test a standard test body having a hemispherical tip and a weight of 100 N is dropped on the disk from a height of 2.2 m, the disk being laid on an annular support having a diameter of 60 mm. The absorbed energy to fracture was measured. The energy value thus found is indicated as "falling dart impact" (DIN 53443).

The values found as well as the composition of the polymer mixtures according to Examples I, II and II and according to comparative example A can be found in Table 1.

TABLE 1

| Example no. | A | I | II | III |
|---|---|---|---|---|
| Composition (parts by weight) | | | | |
| ○ Functionalized polyphenylene ether | 50 | 45 | 45 | 47.5 |
| ○ Polyamide | 50 | 45 | 45 | 47.5 |
| ○ Functionalized EPM | — | 10 | — | — |
| ○ Functionalized ethylene-acrylic rubber | — | — | 10 | — |
| ○ Ethylene-ethyl acrylate copolymer | — | — | — | 5 |
| Properties | | | | |
| ○ Notched Izod Impact (J/m) | 38 | 182 | 308 | 86 |
| ○ Falling Dart-Impact (J) | 1 | 48 | 64 | 66 |
| ○ Tensile yield strength (MPa) | 63 | 60 | 61 | 70 |
| ○ Elongation at fracture (%) | 7 | 30 | 44 | 35 |

It can be seen that the mechanical properties of the mixtures according to the invention are improved over the comparative mixture A.

EXAMPLE IV

The same type of polyamide-6,6 as used in examples I, II and III (72 parts by weight) were precompounded with a functionalized EPDM (28 parts by weight). The used EPDM had an ethylene-propylene ratio of 65 to 35; it contained 7% by weight ethylidene-norbornene. 7% Glycidyl methacrylate had been grafted on the EPDM.

57 Parts by weight of the so obtained precompound were compounded with 10 parts by weight of the same type of EPDM as used above, 25 parts by weight poly(2,6-dimethylphenylene-1,4-ether) and 18 parts by weight of the same type of functionalized polyphenylene ether as used in examples I, II and III. The precompounding and the compounding were performed in an extruder at barrel temperature settings of 280°–290° C., at a screw speed of 300 rpm.

From the so obtained mixture test rods have been molded. The obtained properties are recorded in Table 2.

TABLE 2

| Example | IV |
|---|---|
| Properties | |
| o Notched Izod Impact (J/m) | 500 |
| o Tensile yield strength (MPa) | 35 |
| o Elongation at fracture (%) | 22 |

The polymer mixture according to example IV has a good notched Izod Impact strength.

We claim:

1. A polyphenylene ether-polyamide composition comprising, based on 100 parts by weight of a combination of (A) and (C):

(A) (i) 5 to 94 percent by weight of a polyphenylene ether and (ii) 5 to 94 percent by weight of a polyamide;

(B) one or more compatibilizing agents in an amount sufficient to effect compatibilization between (A) (i) and (A) (ii); and (C) 1 to 50 percent by weight of at least one agent to improve the impact resistance of the composition, wherein the improvement comprises employing as component (C) at least one agent to improve the impact resistance comprised of an alkylene-alkyl(meth)acrylate having a functional group, said functional group selected from the group consisting of carboxylic acid groups, acid anhydride groups, acid amide groups, imido groups, carboxylic acid ester groups, amino groups, hydroxyl groups, epoxy groups and combinations of more than one of the foregoing; and wherein the polymer mixture comprises more than one polyamide, more than one polyphenylene ether and more than one of said impact resistance agents.

2. A polyphenylene ether-polyamide composition comprising, based on 100 parts by weight of a combination of (A) and (C):

(A) (i) 5 to 94 percent by weight of a polyphenylene ether and (ii) 5 to 94 percent by weight of a polyamide;

(B) one or more compatibilizing agents in an amount sufficient to effect compatibilization between (A) (i) and (A) (ii); and (C) 1 to 50 percent by weight of at least one agent to improve the impact resistance of the composition, wherein the improvement comprises employing as component (C) at least one agent to improve the impact resistance comprised of an alkylene-alkyl(meth)acrylate having a functional group, said functional group selected from the group consisting of carboxylic acid groups, acid anhydride groups, acid amide groups, imido groups, carboxylic acid ester groups, amino groups, hydroxyl groups, epoxy groups and combinations of more than one of the foregoing; and wherein the polymer mixture comprises more than one polyamide, more than one polyphenylene ether and more than one of said impact resistance agents; and wherein one or more compatibilizing agents are selected from the group consisting of:

(D) liquid diene polymers or epoxy compounds or compounds having in their molecular structure a double or triple carbon-to-carbon bond and a carboxylic acid, acid anhydride, ester, acid amide, imido, amino or hydroxyl group, in a quantity of from 0.1 to 30 parts by weight per 100 parts by weight of a polyamide plus polyphenylene ether, (E) a functionalized polyphenylene ether consisting of the reaction product of (a) a polyphenylene ether and (b) a compound of the general formula (i) —Z— (ii), in which (i) is at least a group of the formula (X—C(O))— with X=F, Cl, Br, I, —OR, or —O—C(O)—R with R=H, alkyl or aryl, in which (ii) is at least a carboxylic acid, acid anhydride, acid amide, imido, carboxylic acid ester, amino or hydroxyl group, and in which the groups (i) and (ii) are bonded together covalently via a bridge Z, Z being a bivalent hydrocarbon radical, (F) a silane compound having in its molecular structure both (a) at least one silicone atom which is bonded to a carbon atom via an oxygen bridge and (b) (i) at least at ethylenic carbon-to carbon double bond, (ii) a carbon-to-carbon triple bond or, (iii) a functional group selected from an amine group and a mercapto functional group or combinations of (i), (ii) or (iii), in which the function group is not bonded directly to the silicone atom, in a quantity of from 0.05 to 4 parts by weight of polyamide plus polyphenylene ether, (G) an oxidized polyolefin wax, in a quantity of from 0.01 to 10 parts by weight per 100 parts by weight of polyamide plus polyphenylene ether, (H) a copolymer having units of a vinylaromatic compound and an alpha, beta-unsaturated dicarboxylic acid or dicarboxylic acid anhydride or a copolymer with units of a vinyl aromatic compound and of an imide compound of an alpha, beta unsaturated dicarboxylic acid, in a quantity of from 0.5 to 100 parts by weight per 100 parts by weight of polyamide plus polyphenylene ether, and (I) the reaction product of (a) a 1,2-substituted olefinic compound with carboxyl group or acid anhydride group, (b) a polyphenylene ether and (c) a radical initiator, in a quantity of from 0.5 to 150 parts by weight per 100 parts by weight of a polyamide plus polyphenylene ether; and wherein the polyphenylene ether has been replaced partly by one or more of components selected from the group consisting of components (E) and (I).

* * * * *